United States Patent Office 3,444,428
Patented May 13, 1969

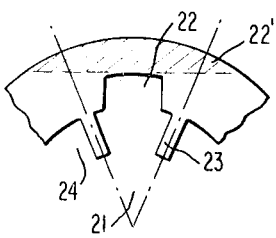

1

3,444,428
MAGNETRON ANODE BLOCKS
René Zwobada, Paris, France, assignor to Societe Lignes Telegraphiques et Telephoniques, Paris, France, a joint-stock company of France
Filed Jan. 7, 1965, Ser. No. 423,951
Claims priority, application France, Jan. 15, 1964, 960,370, 960,371; Dec. 21, 1964, 999,337
Int. Cl. H01j 25/50, 25/58
U.S. Cl. 315—39.53                1 Claim

ABSTRACT OF THE DISCLOSURE

An anode for a magnetron is disclosed which is a hollow cylindrical member having a plurality of vanes extending radially inwardly to define a plurality of ringing cavities. A coupling structure includes a longitudinal inner groove along the curved bottom of one of the ringing cavities, a bore in an outer wall of the member at right angles to the axis thereof and extending inwardly to the bottom of the inner groove and a circular groove extending further inward from the bottom of the bore and intersecting the inner groove at opposite ends thereof and a coupling sleeve engaging the bore and circular groove across the inner groove to provide a pair of shorting stubs across the coupling.

---

The present invention relates to improvements to magnetron structures and more particularly to multicavity magnetron structures designed to operate at the higher end of the microwave range. "Multicavity structure" as used here means structures with more than two cavities bounded between radial vanes inside a hollow cylinder. These terms comprise the structures usually known as "rising sun," "coaxial structures" and "ring strapped multicavity structures." The anode fabrication of this type of tube is one of the main difficulties of such a construction. Indeed, the dimensions of the vanes and of the cavities are related to the wavelength at which the tube operates. At centimetric wavelengths and shorter wavelengths, the machining of these structures is fairly difficult. On the other hand, the number of vanes is also an operating parameter for the tube structure. At higher frequencies, a rather high number of vanes should be used which leads to still smaller cavities. It is also necessary to provide means for extracting the microwave energy which builds up in the interaction space in order to be able to use such an energy. Coupling between the structure and a load circuit is usually obtained through one or several coupling slots as in the case of a coaxial structure. The dimensions of such slot are also related to wavelength.

According to current practice, the anode structure is obtained through machining of a hollow cylinder on one side, and machining of the inner vanes on the other side. The coupling slot is machined in the hollow cylinder and usually from the inside towards the outside of the cylinder in order to secure the high surface smoothness required from such an oscillating structure. The vanes are then mounted into the cylinder, usually through brazing. Cutting the coupling slot is very difficult and a special set-up and jig has to be designed; the operation requires highly skilled personnel. In the case of coaxial structures, the difficulty is still increased owing to the larger number of coupling slots. Indeed, this type of structure is made of a series of sectoral cavities delimited by radial vanes projecting from a hollow cylinder and an outside hollow cylindrical cavity surrounding said series of cavities. The external cavity is coupled to the load as in any other type of tubes but coupling is to be provided between the inner cavities and the cylindrical cavity by means of axial coupling slots cut out of the thin outside cylindrical wall

2 of the inner cavities. Machining of such coupling slots raises the same difficulties as machining of the output slot to the load. Brazing the vanes inside the cylindrical wall presents also technical difficulties owing to the number and the size of the parts to be simultaneously brazed.

Stable operation of a multicavity anode on mode pi requires interconnection of the cavities. As is well known, this intercoupling is obtained through electric short-circuiting between alternate vanes or anode segments, usually performed by means of two sets of rings usually known as straps. Two different shapes of grooves are provided in order to secure contact between a given strap and alternate segments.

It is an object of the invention to provide for complete multicavity anode structures operating at centimetric or shorter wavelengths the fabrication of which includes the coupling slot and necessitates only current machining methods associated with at most one hobbing step.

It is an object of the invention to provide for multicavity anode structures oscillating at the higher extremity of the microwave range in which the coupling slot does not require a special method of fabrication.

It is another object of the invention to provide for multicavity anode structures which do not require a special method of fabrication of the coupling slot nor the brazing of the vanes.

It is a further object of the invention to provide for a multicavity anode structure in which all the vanes have identical grooves.

It is another object of the invention to provide for magnetron anode structures the fabrication of which is economical both from the time point of view and from the manufacturing processes involved.

The structures according to the present invention incorporate at least one coupling slot open at least at one end and bounded at said open end by means of an externally added part.

According to another feature of the invention, the coupling slot cut out in the cylindrical wall of the anode structure opens in a flat face machined on the external surface of said cylindrical anode wall, said face being provided with recesses for housing the external part provided in order to fix the desired slot length.

According to another feature of the invention, the length of the coupling slot is fixed directly by the output transformer connecting the anode structure to the load waveguide.

Owing to the fact that they are open ended, the coupling slots in the anode structures according to the invention can be machined by means of current practice methods, while still maintaining the high precision in their dimensions. They can be obtained through broaching of an open slot or an initial longitudinal groove. The electro-sparking step is suppressed. The slot is externally terminated by a brazed ring. This type of machining allows for a very high quality surface of the internal wall of the cylinder. The vanes are then brazed into the cylindrical block as usual.

It is however preferred to obtain the slot or slots and the central cavities thorugh a single hobbing step. Hobbing requires a thick metal block. Therefore, it will provide for a block containing the cavities and longitudinal recesses or groove which will not cross the complete metal thickness to open outside. Low cost machining from the outside such as turning removes the metal up to the bottom of the recess or groove which thereby becomes an open slot. The thickness and the width of the slot are obtained with the high precision of the hobbing method. The length of the slot is set with high precision from the outside of the structure, such as by brazing an added part. According to current practice a transformer is placed between the anode block and the load waveguide in order to match the impedances of the anode-cathode space to the waveguide. Setting of the transformer is a difficult operation owing to the small thickness of the cylindrical wall imposed by thin slot coupling at centimetric and shorter wavelengths. In the structures according to the invention, the coupling slot is machined from a thick metal block and the correct thickness of the slot is obtained by removing metal from the outside. It is therefore much easier to provide means for fixing the transformer during such metal removal operation. The transformer itself can advantageously be used to limit the operating length of the coupling slot at its correct value instead of the added part.

The vanes as obtained by hobbing from a solid metal block can be produced with alternate radial lengths as is required in "rising sun" structures. In multicavity strapped structures, recesses for the straps are to be machined at the ends of the vanes. As explained already, in prior art structures, these recesses are of two different shapes and therefore will require unconventional machining such as electro-sparking, end-milling, ultra sound machining, etc. These methods do not provide for sharp angles which will make it difficult to braze the straps. In an embodiment of the invention, the strap grooves are made in two steps based on the observation that the two shapes of recesses always have a common part which is of revolution around the axis of the cylindrical structure and by adding to such common part two types of auxiliary grooves, it is possible to differentiate them into the two groove shapes. Therefore, in the first machining step, an annular groove is obtained through revolution machining such as turning which provides for high precision and smooth surfaces and is low priced. The profile of said first annular groove is chosen so as to provide for the end faces on which contact is made between the straps and the vanes. A second machining step enlarges differently each successive groove so that each strap will only be in contact with alternate vane. The precision and surface state of the second step of machining is not so important since it is only used to remove metal to prevent contact. All the meeting faces are provided by the first high precision machining step. In another embodiment of structures according to the invention, all the vanes are provided with similar recesses or grooves and the straps are profiled so as to provide alternate contact between successive vanes on each strap. Making similar recesses only requires a turning step, which is both high precision and low cost. The straps are provided with fingers periodically distributed along their periphery which ensure the necessary contact with the cooperating vanes. Such profiled straps are obtained from slices cut from the anode block after hobbing. The frustums of vanes attached to the rings thus obtained provide for contact fingers which will azimuthally match the grooves in the vanes of the anode block after suitable shaping.

The invention will be better understood by reference to the following description and to the accompanying drawings given as non limitative illustration of structures according to the invention and in which:

FIGURE 1 is a perspective view with parts broken away of a partially completed magnetron anode in accordance with the present invention;

FIGURE 2 is a view similar to FIGURE 1 but showing the anode block completed;

FIGURE 3 is a diagrammatic showing of how the metal of the block is removed to arrive at the structure of FIGURE 2; and FIGURE 4 is an exploded perspective view to indicate the manner in which an output transformer is brazed to the outside face of a ring member which terminates the opposite ends of the coupling slot.

FIGURE 1 shows a block 20 which has been partially machined to produce an anode structure in accordance with the present invention. A central cylindrical cavity 21 and a longitudinal groove 22 are provided by broaching. Groove 22 is made into the coupling slot through further external removal of metal from the hatched area 22' shown in FIGURE 3 as will be further explained in detail. The vanes which have been separately machined are jig assembled and brazed inside the central opening 21 so as to constitute the sectoral cavities of the anode structure. The mounting of the vanes is azimuthally set so that slot 22 will be directed according to the axis of the one of the cavities. If a multicavity structure is to be produced, identical vanes are used in which non identical grooves are further machined in order to house the straps.

The open-ended coupling slot 22 is terminated at both ends by means of an external part as explained by reference to FIGURES 1 to 3. The anode block thus manufactured still requires a non revolution or unconventional machining step though it has already greatly simplified the coupling slot production and eliminated any precision requirement from the unconventional machining step.

A preferred structure is shown in FIGURES 1 to 3 in which both the longitudinal groove 22 and the cavities are simultaneously obtained by hobbing from the metal cylinder 20. Therefore brazing of the vanes is suppressed and the internal surface state of the cavities is much improved. The coupling groove 22 is obtained by means of a high precision fabrication method used for another purpose, it is made into a slot by means of low cost conventional machining which does not influence its dimensions.

FIGURE 1 shows the cylindrical block 20 partially cut after the first hobbing step. FIGURE 2 shows the anode block completed. Identical vanes 23 protrude in the central cavity 21. As shown on the partial cut view of FIGURE 3, the terminal face of groove 22 is more distant from the axis of the cylindrical structure than the end faces of the cavities. The difference corresponds to the thickness of the coupling slot. The hobbing tool has to be correctly designed in order to meet these requirements. Both the vanes and groove 22 are continued, upwards at least, to the end of the structure when the hobbing is performed downwards. The length of the vanes is reduced as appears on FIGURE 2 and an annular recess 25 is machined in the thickness of cylinder 20 for mounting facility. Identical grooves 26 are also turned at both ends of vanes 23. The straps will be located in the grooves 26.

By turning from the outside around an axis perpendicular to the block axis, the metal corresponding to area 22' on FIGURE 3 is removed from the cylinder around groove 22, so that it will communicate with the outside as a completed coupling slot. The recess in the block is shown at 27 in FIGURE 2. Simultaneously an annular groove is cut in the thickness of the metal. The internal diameter of said groove corresponds to the operating length of the coupling slot. Metallic ring 28 is brazed in this groove so as to terminate the open slot at 29 and 30. Simultaneously the output transformer is brazed to the outside face of ring 28 as shown on exploded view of FIGURE 4. In this figure, anode block 20 is seen from outside and is rotated about 180° with respect to its position in FIGURES 1 to 3. Coupling slot 22 appears at the left hand side of the block. The external flat 31 machined in block 20 corresponds to the metal removed at 22' from the block so as to complete groove 22. The annular groove 27 for ring 28 appears as a recess machined out of face 31. Transformer 33 is terminated by a flange brazed to the outer end of ring 28.

I claim:
1. A multicavity magnetron anode comprising:
   (a) a substantially cylindrical hollow member having radial vanes extending inwardly from the inner surface of said member to define a plurality of ringing cavities around a central cavity and opening thereinto, and a longitudinal inner groove along the curved bottom of one of said ringing cavities;
   (b) means providing a coupling slot in said member, said means comprising an outer bore in the outer wall of said member, at right angles to the axis thereof, said bore extending inwardly to the bottom of said inner groove so that a portion of said groove opens into said bore to form a coupling slot;

(c) said means further comprising a circular groove extending further inwards from the bottom of said bore and intersecting said inner groove near the opposite ends thereof;

(d) and a coupling sleeve engaging said bore and circular groove across said inner groove to define a pair of shorting stubs across the coupling slot from said one ringing cavity into said coupling sleeve.

References Cited

UNITED STATES PATENTS

| | | | |
|---|---|---|---|
| 2,485,401 | 10/1949 | McArthur | 315—39.69 X |
| 2,624,864 | 1/1953 | Herlin et al. | 315—39.77 X |
| 2,625,669 | 1/1953 | Anderson | 315—39.69 X |
| 2,976,458 | 3/1961 | Feinstein | 315—39.77 |
| 3,028,522 | 4/1962 | Pease | 315—39.65 X |
| 3,169,211 | 2/1965 | Drexler et al. | 315—39.77 |
| 3,305,693 | 2/1967 | Hull | 315—39.51 X |

FOREIGN PATENTS 714,450  8/1954  Great Britain.

ELI LIEBERMAN, *Primary Examiner.*

SAXFIELD CHATMON, JR., *Assistant Examiner.*

U.S. Cl. X.R.

315—39.75